June 15, 1926.
F. BISHOP
LAWN EDGER
Filed Feb. 20, 1926
1,588,694
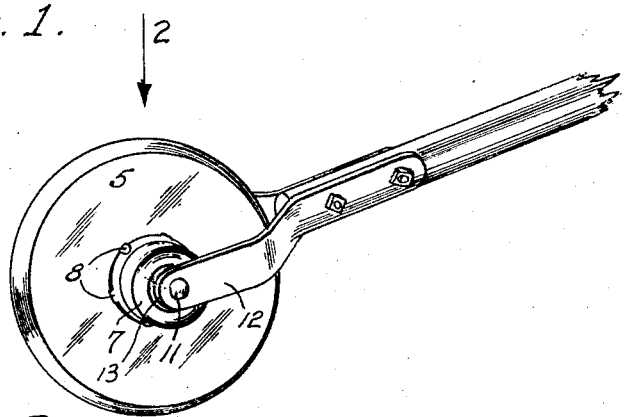
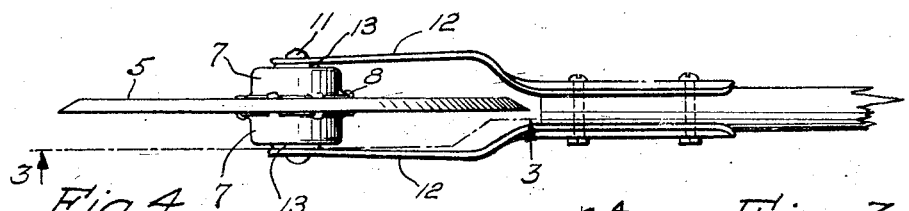
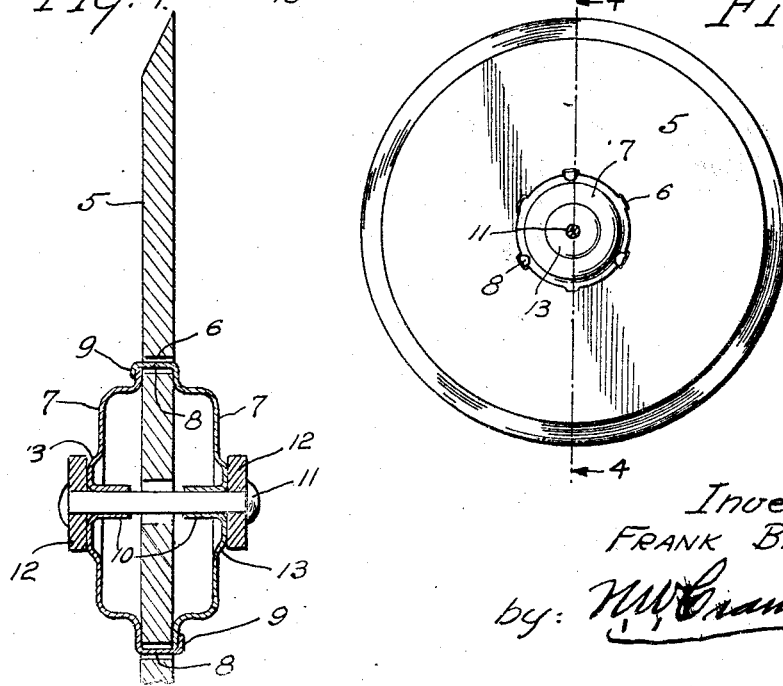
Inventor:
FRANK BISHOP.
by: N. W. Crandall
Atty.

Patented June 15, 1926.

1,588,694

UNITED STATES PATENT OFFICE.

FRANK BISHOP, OF LOS ANGELES, CALIFORNIA.

LAWN EDGER.

Application filed February 20, 1926. Serial No. 89,733.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to lawn edgers and other tools that employ disk colters, and its principal object is to provide a very simple, inexpensive, and otherwise satisfactory rotative mounting for a thin disk colter. Another object is to supply new and better means for indefinitely maintaining a substantially constant frictional resistance to rotation of the colter in such a mounting.

My objects are attained in the manner illustrated in the accompanying drawing, in which—

Figure 1 is a perspective view of a portion of a lawn edger with my invention applied thereto:

Figure 2 is a plan view, on a larger scale, of the construction shown in Fig. 1:

Figure 3 is a sectional elevation of a portion of the above construction, taken on the line 3—3 of Fig. 2; and Figure 4 is a still further enlarged section of my improved colter mounting, taken on the line 4—4 of Fig. 3.

Similar reference numerals refer to similar parts throughout the several views.

My invention comprises a thin disk colter 5 provided with a series of slotted perforations 6 on a concentric circle of relatively small radius. The hub of the colter is composite and is formed by means of a pressed steel cup 7 of special form on each side of the colter. The rims of these hub cups are deeply castellated to form teeth 8 of suitable dimensions for passing through slots 6 in the colter, and for then being clinched over the rim of the other hub as shown most clearly at 9 in Fig. 4. Obviously the number of teeth on each hub cup should be the same and equal to one-half the number of corresponding perforations in the colter disk, and the teeth of the two cups are staggered with respect to each other when mounted.

Hub cups 7 are preferably die-formed with inwardly projecting circular flanges 10, co-axial with the cups, to form journal bearings engaging the axle pin 11. This axle pin, in the form of my invention selected for illustration, does not turn, and the hub cups, which carry the colter, turn upon the pin. The extremities of the axle pin pass through the respective arms of a bail 12, and are fixed therein.

For cutting Bermuda grass and similar purposes it is desirable not to have the colter rotate too easily. I therefore have provided means for applying a frictional resistance to turning that will remain practically constant for an indefinite period. This is accomplished by means of die-forming concentric circular ridges 13 on the outside of the hub cups, and by making the length of axle pin 11 such that the requisite frictional pressure will be applied to ridges 13 by the bail arms when the axle pin is fixed therein. The resiliency of the material of which the hub cups are formed will maintain a substantially constant frictional pressure between the bail arms and hub cups for an indefinite period, and even after the parts have become considerably worn.

Having thus fully described my invention in a manner that will make its construction and operation clear to those familiar with such constructions, I claim:

1. In combination; a disk colter having a series of perforations therethrough arranged on a concentric circle; and a co-axial hub cup on each side of said disk; said cups having castellated rims with fingers thereon projecting through said perforations and clinched over the rim of the opposed cup.

2. In combination; a disk colter having a series of perforations therethrough arranged on a concentric circle; and a co-axial hub cup on each side of said disk; said cups having castellated rims with fingers thereon projecting through said perforations and clinched over the rim of the opposed cup; and said cups being provided with internal journal bearings whereby they may be rotatively mounted upon an axle.

3. In combination; a disk colter having a series of perforations therethrough arranged on a concentric circle; and a co-axial hub cup of resilient material on each side of said disk; said cups having castellated rims with fingers thereon projecting through said perforations and clinched over the rim of the opposed cup, and internal journal bearings whereby they may be rotatively mounted upon an axle; and said cups being provided with concentric circular raised areas on their exteriors whereon a pressure may be applied to yieldingly resist rotation of the cups.

4. In combination; a disk colter having a series of perforations therethrough arranged on a concentric circle; a co-axial hub cap of resilient material on each side of said disk and attached thereto by forming the cups with castellated rims with fingers thereon projecting through said perforations and clinched over the rim of the opposed cup; co-axial journal bearings within the cups and integral therewith; a bail with legs straddling said colter and hub cups; and an axle pin passed through said journal bearings and bail legs; said cups being provided with concentric circular raised areas on their exteriors whereon a pressure may be applied by means of said bail legs to yieldingly resist rotation of the cups.

FRANK BISHOP.